(12) United States Patent
Nakano et al.

(10) Patent No.: US 10,298,064 B2
(45) Date of Patent: May 21, 2019

(54) POWER RECEIVING UNIT, POWER FEEDING CONTROL METHOD, AND FEED SYSTEM

(71) Applicant: SONY CORPORATION, Tokyo (JP)

(72) Inventors: Hiroaki Nakano, Kanagawa (JP); Keigo Bunsen, Kanagawa (JP); Osamu Kozakai, Kanagawa (JP); Kenichi Fujimaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 230 days.

(21) Appl. No.: 15/119,176

(22) PCT Filed: Feb. 10, 2015

(86) PCT No.: PCT/JP2015/053585
§ 371 (c)(1),
(2) Date: Aug. 16, 2016

(87) PCT Pub. No.: WO2015/125655
PCT Pub. Date: Aug. 27, 2015

(65) Prior Publication Data
US 2017/0012470 A1    Jan. 12, 2017

(30) Foreign Application Priority Data

Feb. 24, 2014 (JP) .................. 2014-033228

(51) Int. Cl.
| H01F 27/42 | (2006.01) |
| H01F 37/00 | (2006.01) |
| H01F 38/00 | (2006.01) |
| H02J 50/12 | (2016.01) |
| H02J 50/80 | (2016.01) |
| H02J 5/00  | (2016.01) |
| H02J 7/02  | (2016.01) |

(52) U.S. Cl.
CPC .............. *H02J 50/12* (2016.02); *H02J 5/005* (2013.01); *H02J 7/025* (2013.01); *H02J 50/80* (2016.02)

(58) Field of Classification Search
CPC .. H02J 5/005; H02J 7/025; H02J 50/80; H02J 50/12; H02J 50/10
See application file for complete search history.

(56) References Cited

U.S. PATENT DOCUMENTS 9,673,868 B2 *  6/2017  Curtis ................. H04B 5/0037
9,973,039 B2 *  5/2018  Morreale ............... H02J 50/12
(Continued)

FOREIGN PATENT DOCUMENTS

| JP | 09-121182 A    | 5/1997  |
| JP | 2007-288718 A  | 11/2007 |

(Continued)

*Primary Examiner* — Alfonso Perez Borroto
*Assistant Examiner* — Esayas G Yeshaw
(74) *Attorney, Agent, or Firm* — Chip Law Group

(57) ABSTRACT

A power receiving unit of the disclosure includes: a power generation section configured to generate direct-current power, based on a power signal supplied wirelessly from a power feeding unit; and a communication section configured to set a load of the power signal in accordance with an output current of the power generation section, and to communicate with the power feeding unit by modulating the load.

14 Claims, 15 Drawing Sheets

(56) References Cited

U.S. PATENT DOCUMENTS

| | | | | |
|---|---|---|---|---|
| 2012/0146576 A1* | 6/2012 | Partovi | ................ | H01F 7/0252 |
| | | | | 320/108 |
| 2012/0280650 A1* | 11/2012 | Kim | ........................ | H02J 17/00 |
| | | | | 320/108 |
| 2013/0147279 A1* | 6/2013 | Muratov | ................. | H02J 5/005 |
| | | | | 307/104 |
| 2013/0260676 A1* | 10/2013 | Singh | ................... | H04B 5/0037 |
| | | | | 455/41.1 |
| 2014/0001879 A1* | 1/2014 | Van Wageningen | ... | G01R 21/00 |
| | | | | 307/104 |
| 2014/0232201 A1* | 8/2014 | Staring | ................... | H02J 5/005 |
| | | | | 307/104 |
| 2015/0077046 A1* | 3/2015 | Huang | ................. | B60L 11/182 |
| | | | | 320/108 |
| 2015/0123679 A1* | 5/2015 | Kuyvenhoven | .... | G06K 19/0717 |
| | | | | 324/652 |
| 2016/0181818 A1* | 6/2016 | Joye | ........................ | H02J 5/005 |
| | | | | 307/104 |
| 2017/0018971 A1* | 1/2017 | Oshima | ................... | H02J 50/10 |

FOREIGN PATENT DOCUMENTS

| | | |
|---|---|---|
| JP | 2009-065514 A | 3/2009 |
| JP | 2012-514896 A | 6/2012 |

* cited by examiner

[ FIG. 1 ]
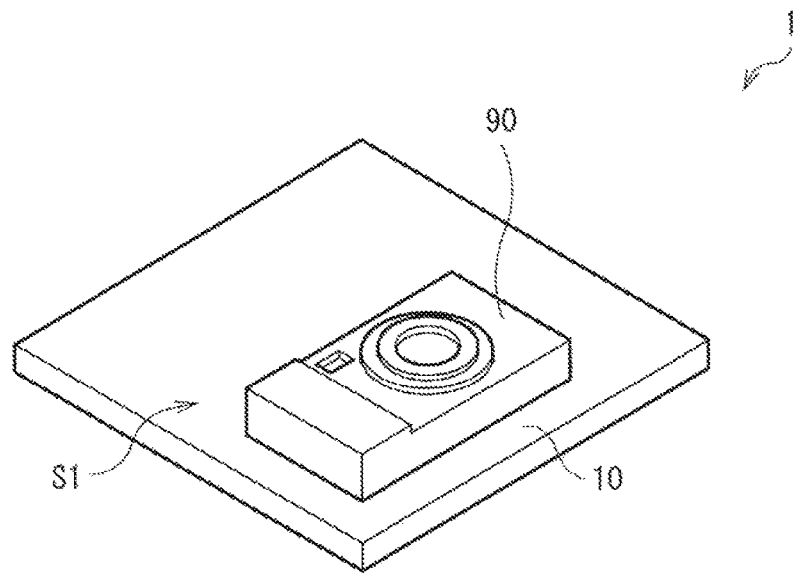
[ FIG. 2 ]
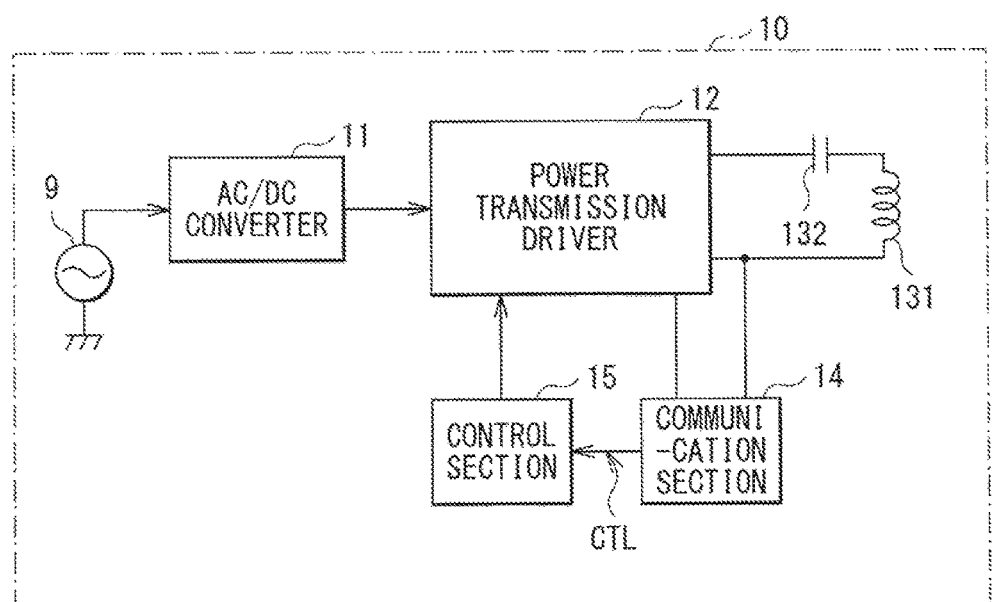

[FIG. 3]
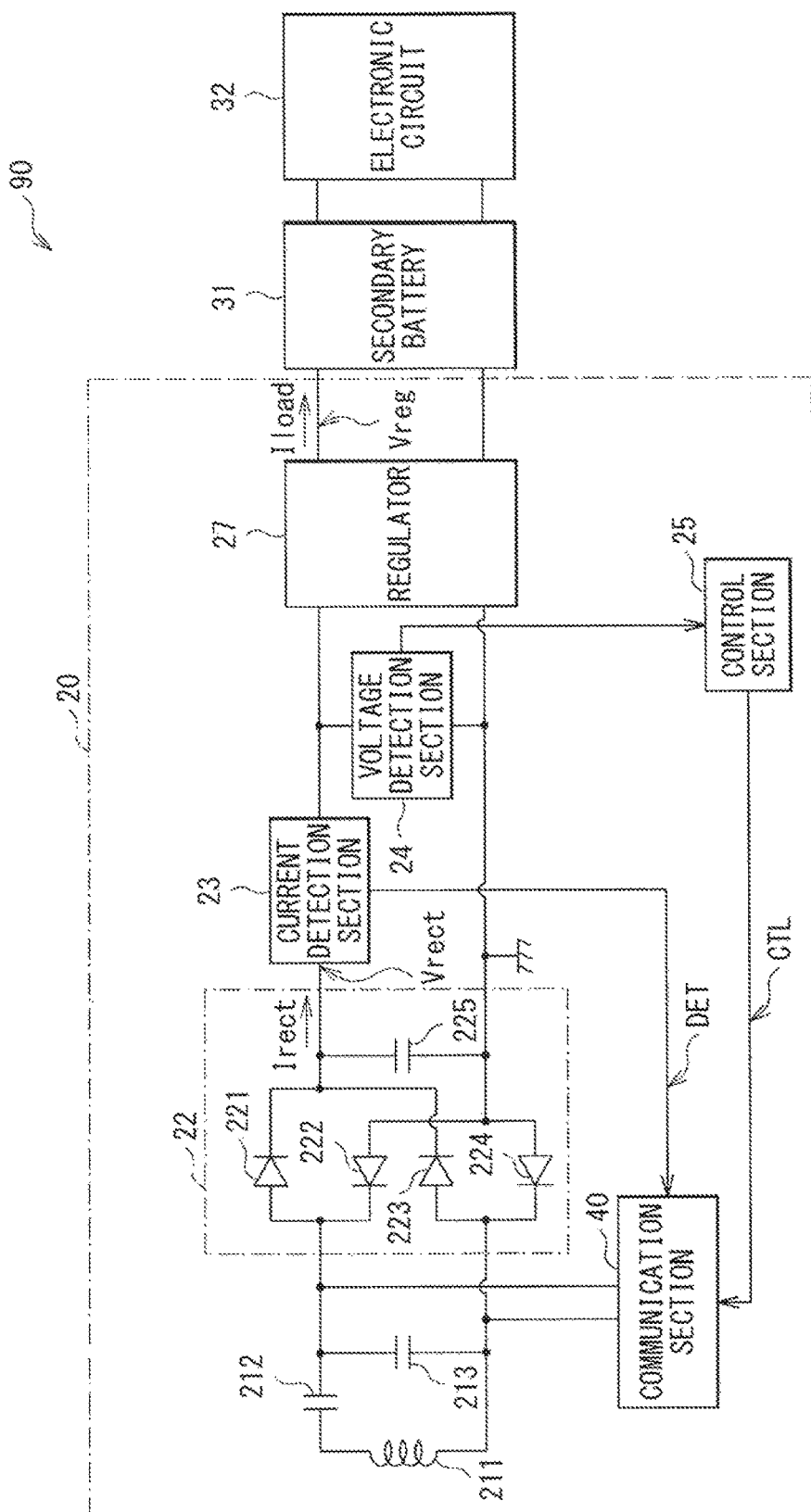

[FIG. 4]
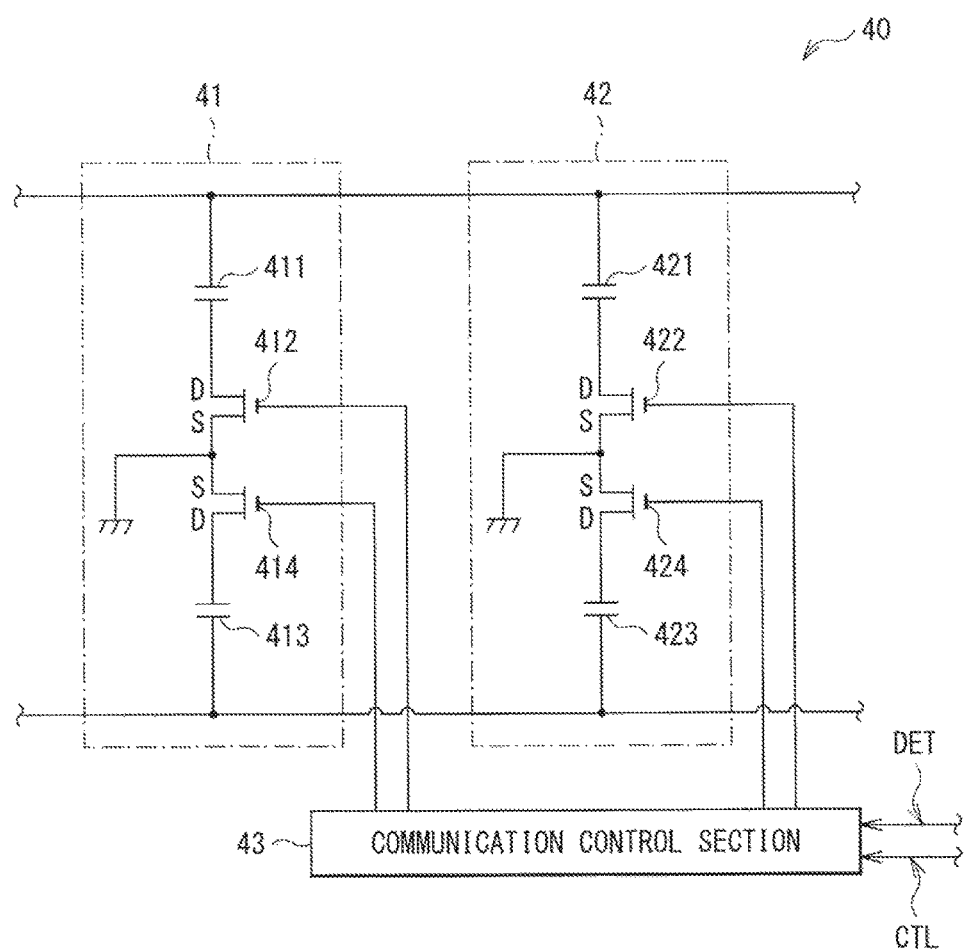

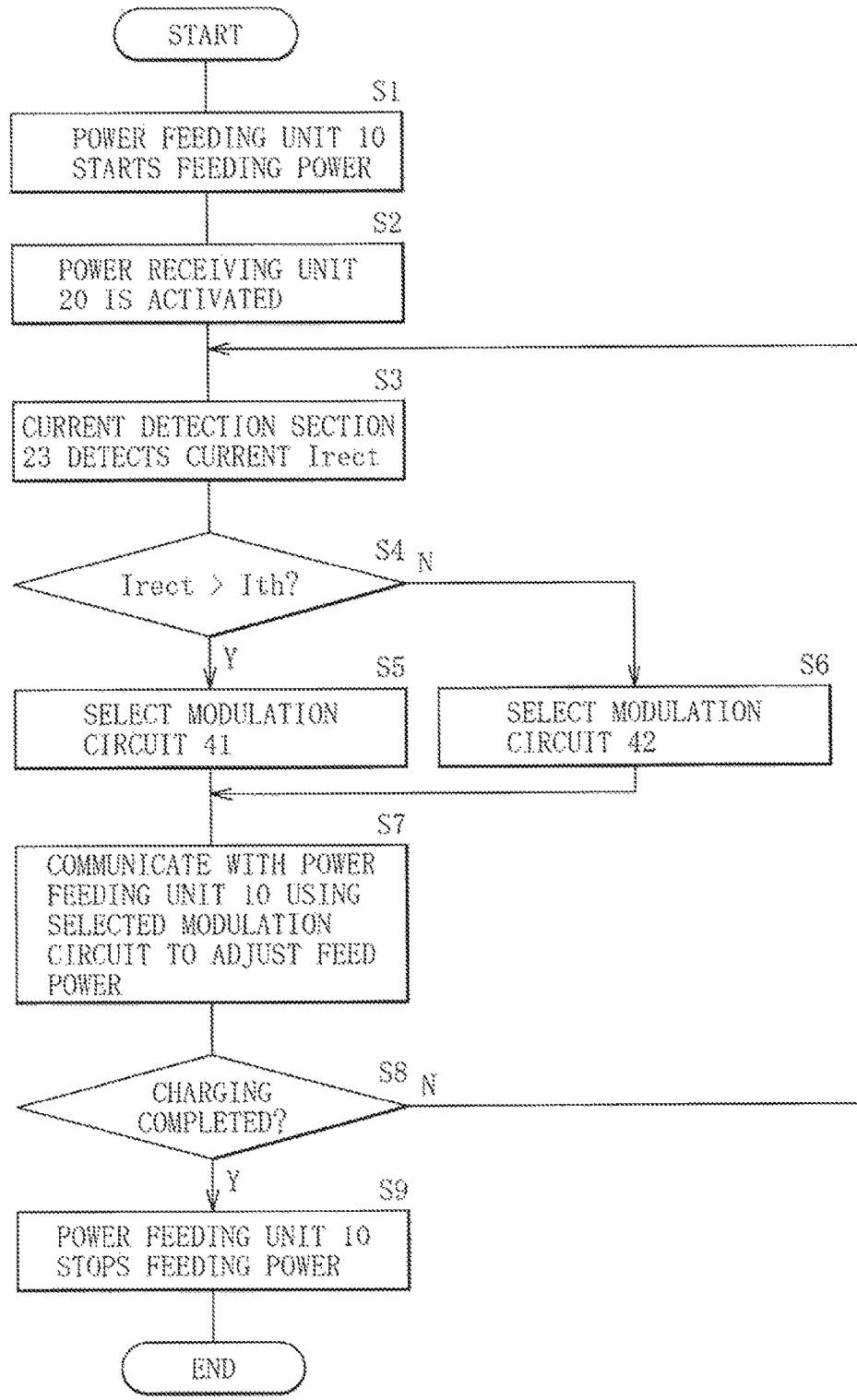
[FIG. 5]

[ FIG. 6 ]
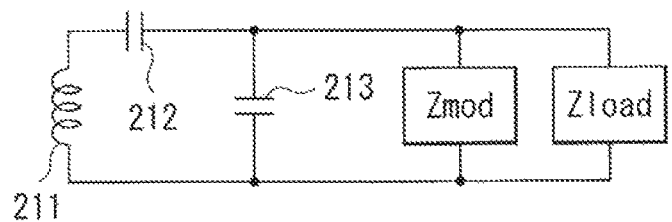
[ FIG. 7 ]
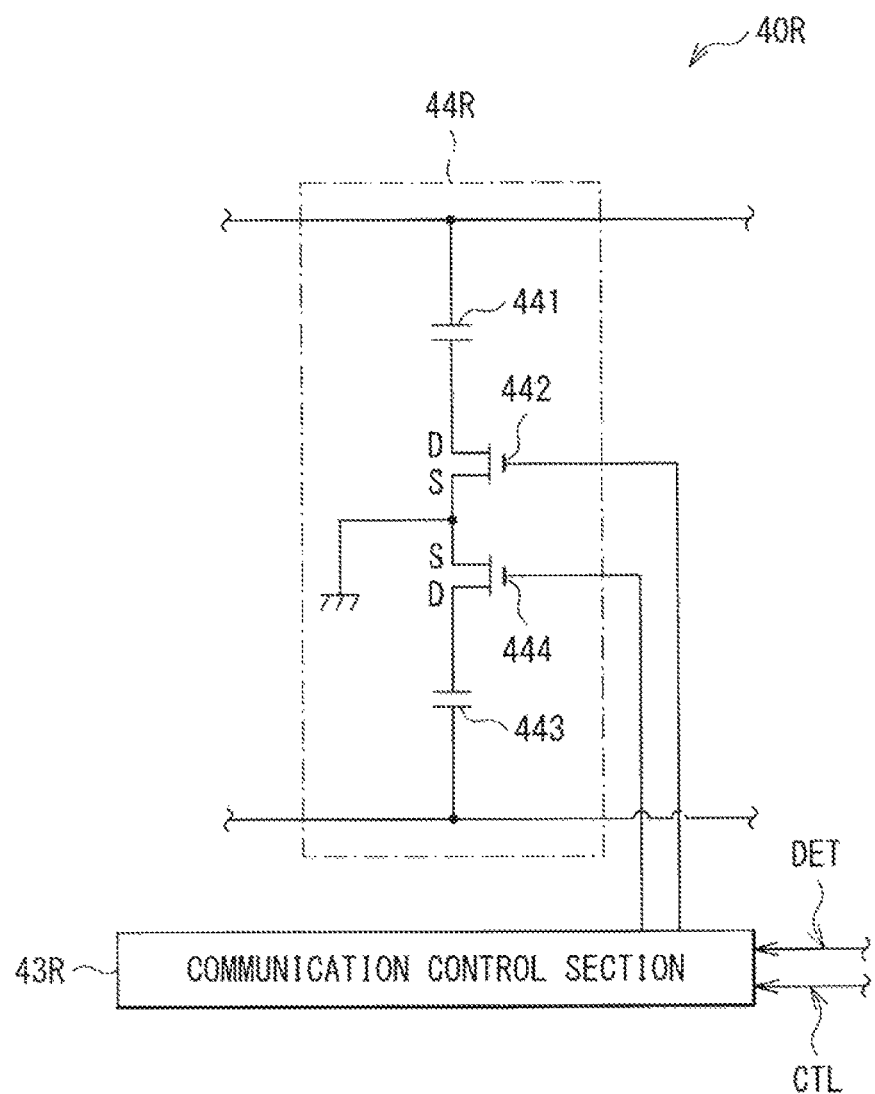

[ FIG. 8 ]
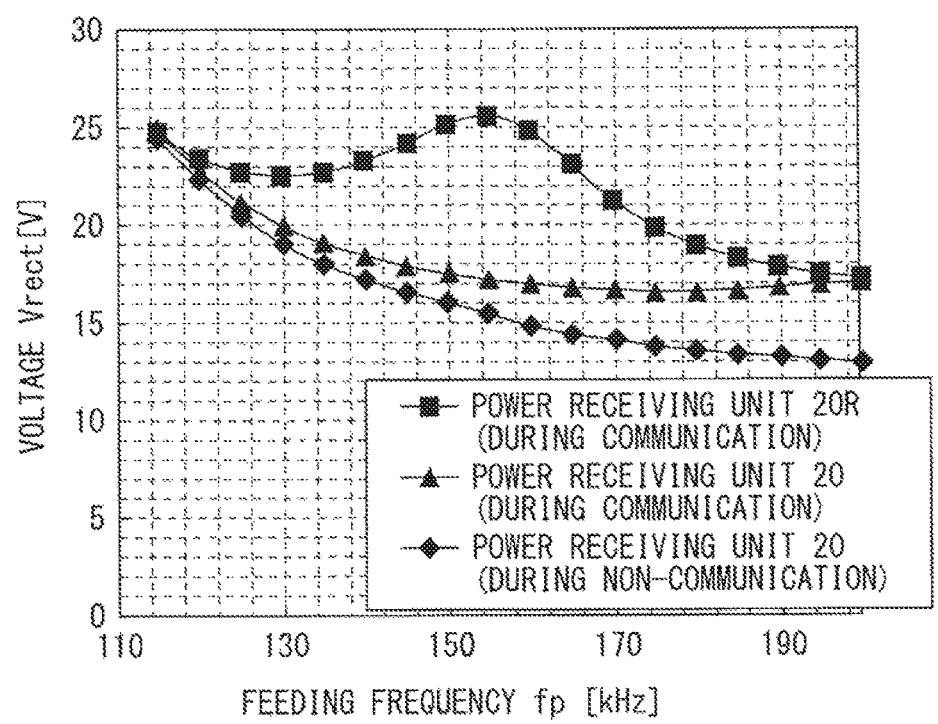

[FIG. 9]
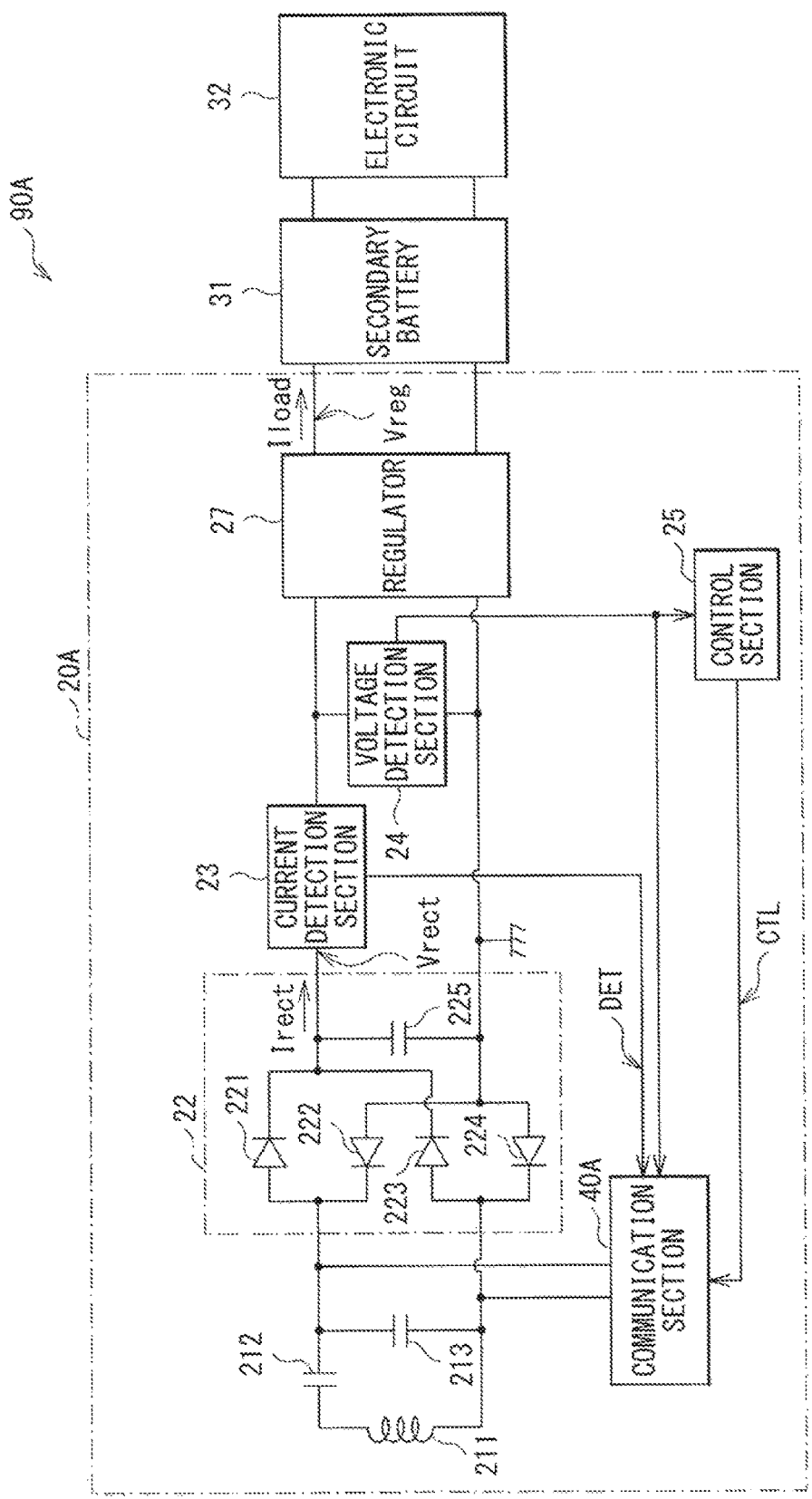

[FIG. 10]
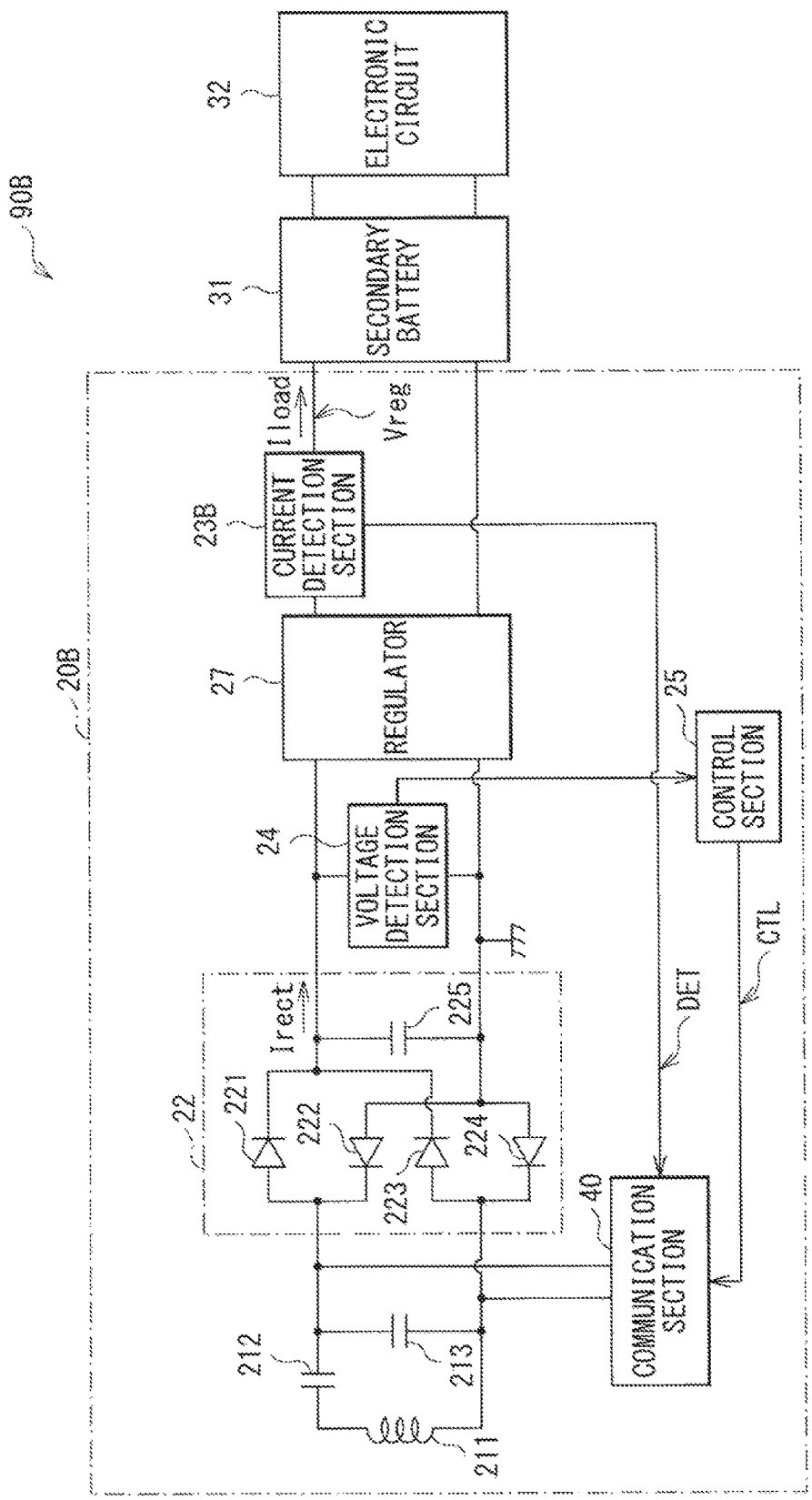

[FIG. 11]
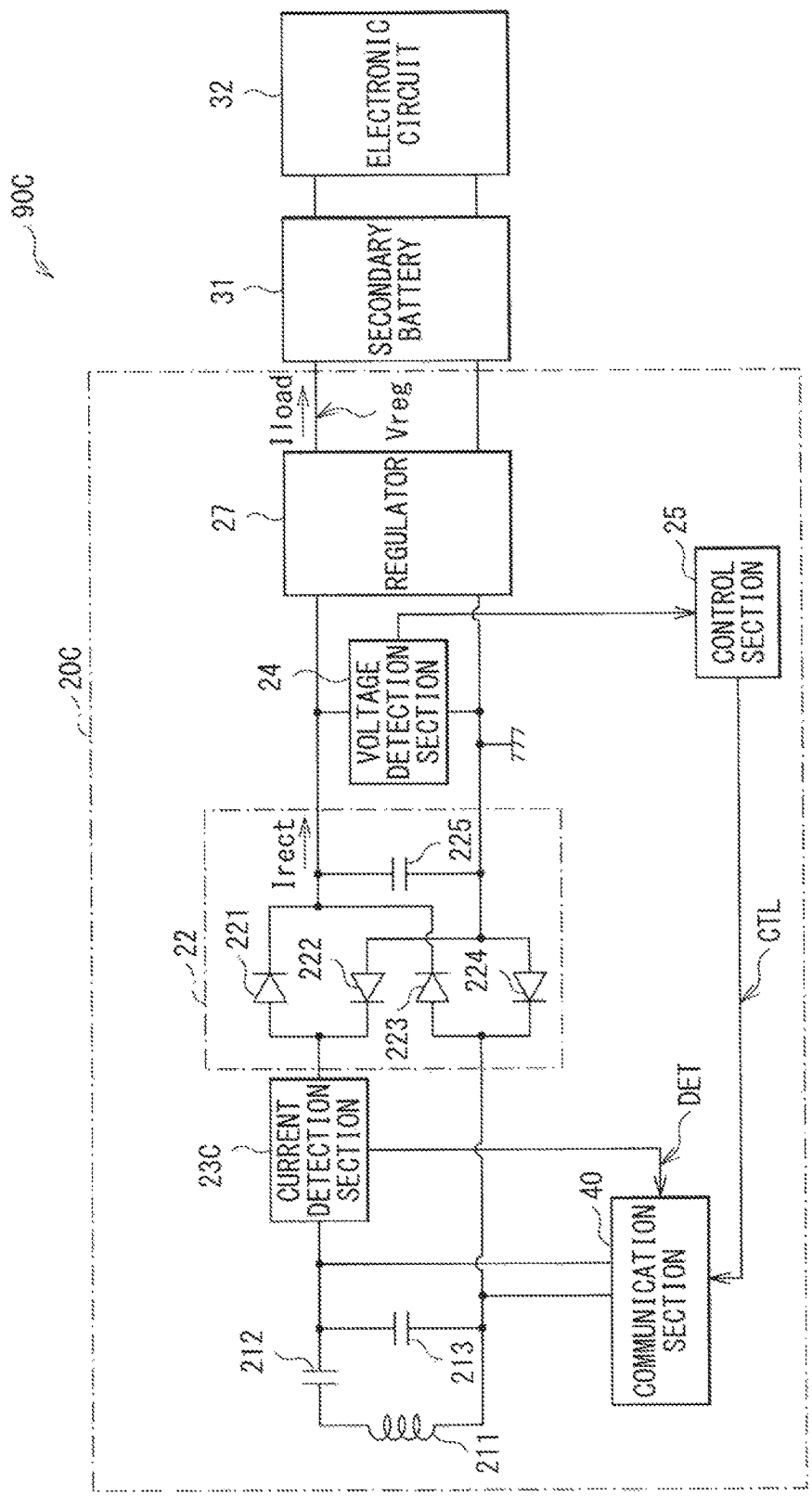

[ FIG. 12 ]
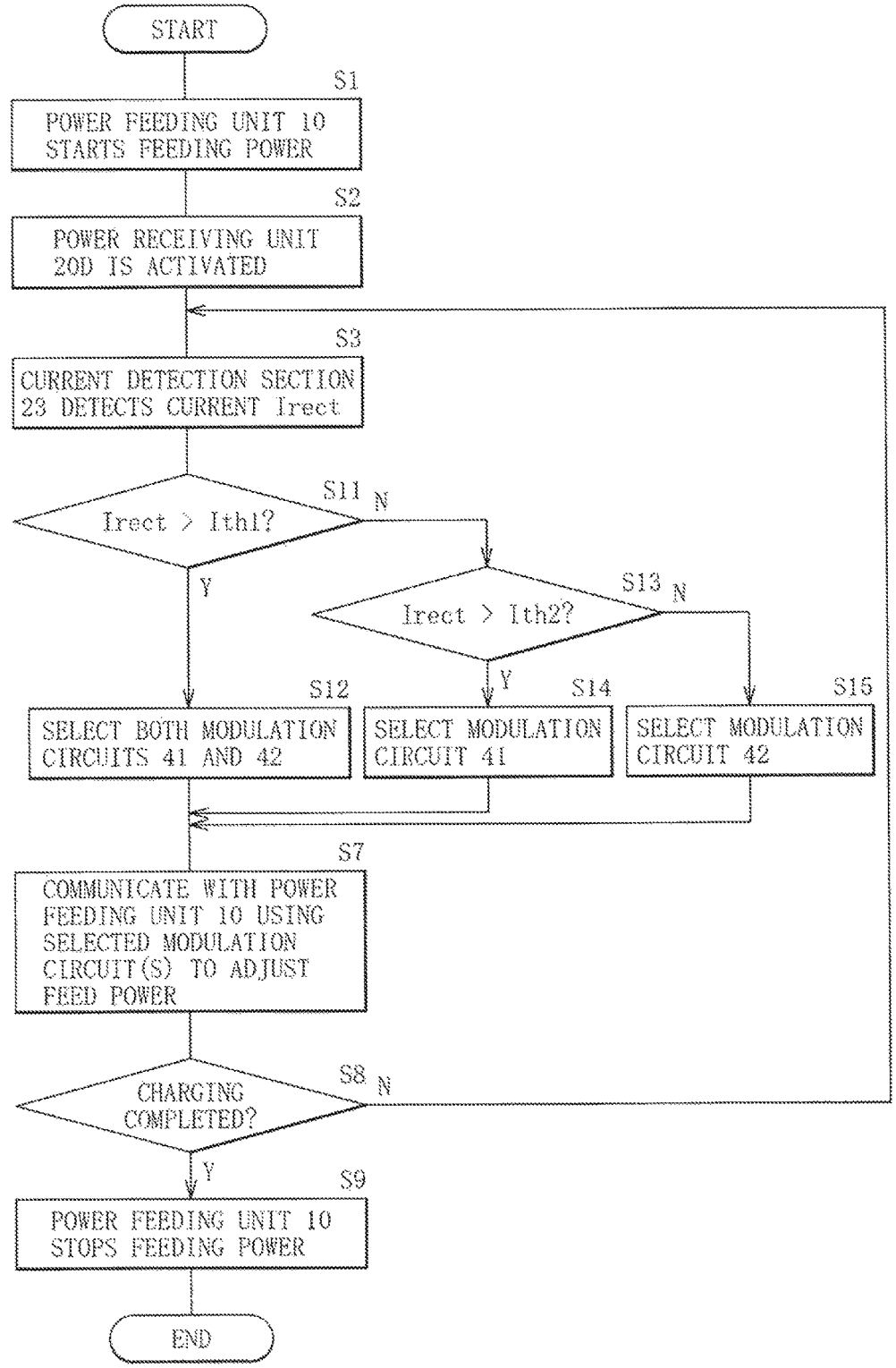

[FIG. 13]
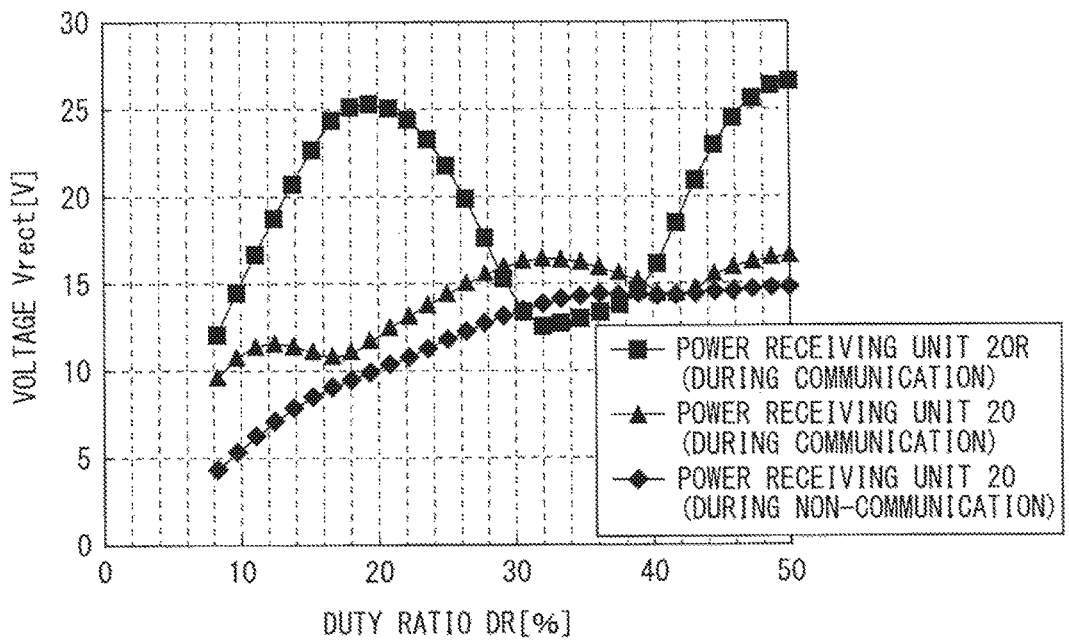
[FIG. 14]
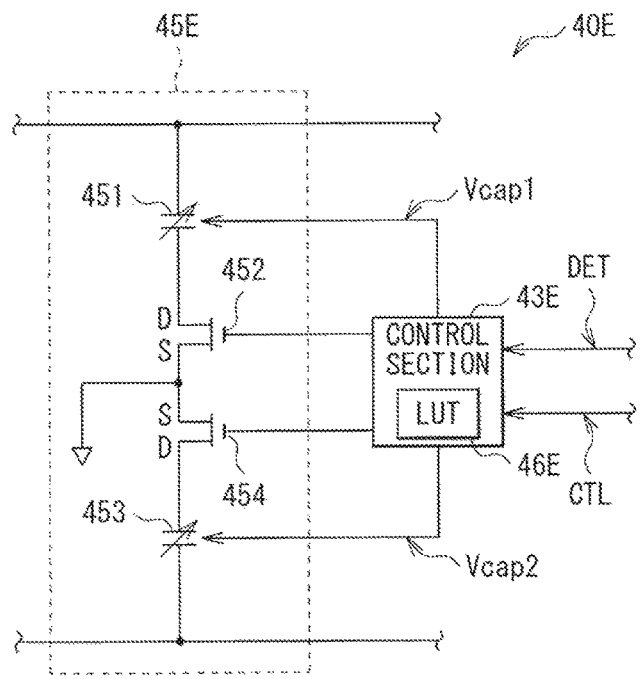

[ FIG. 15 ]

| CURRENT Irect | CAPACITANCE VALUE OF VARIABLE CAPACITORS 451 AND 453 |
|---|---|
| 0~200 [mA] | 5 [nF] |
| 200~500 [mA] | 10 [nF] |
| 500~1000 [mA] | 20 [nF] |
| 1000~2000 [mA] | 30 [nF] |
| 2000~ [mA] | 50 [nF] |

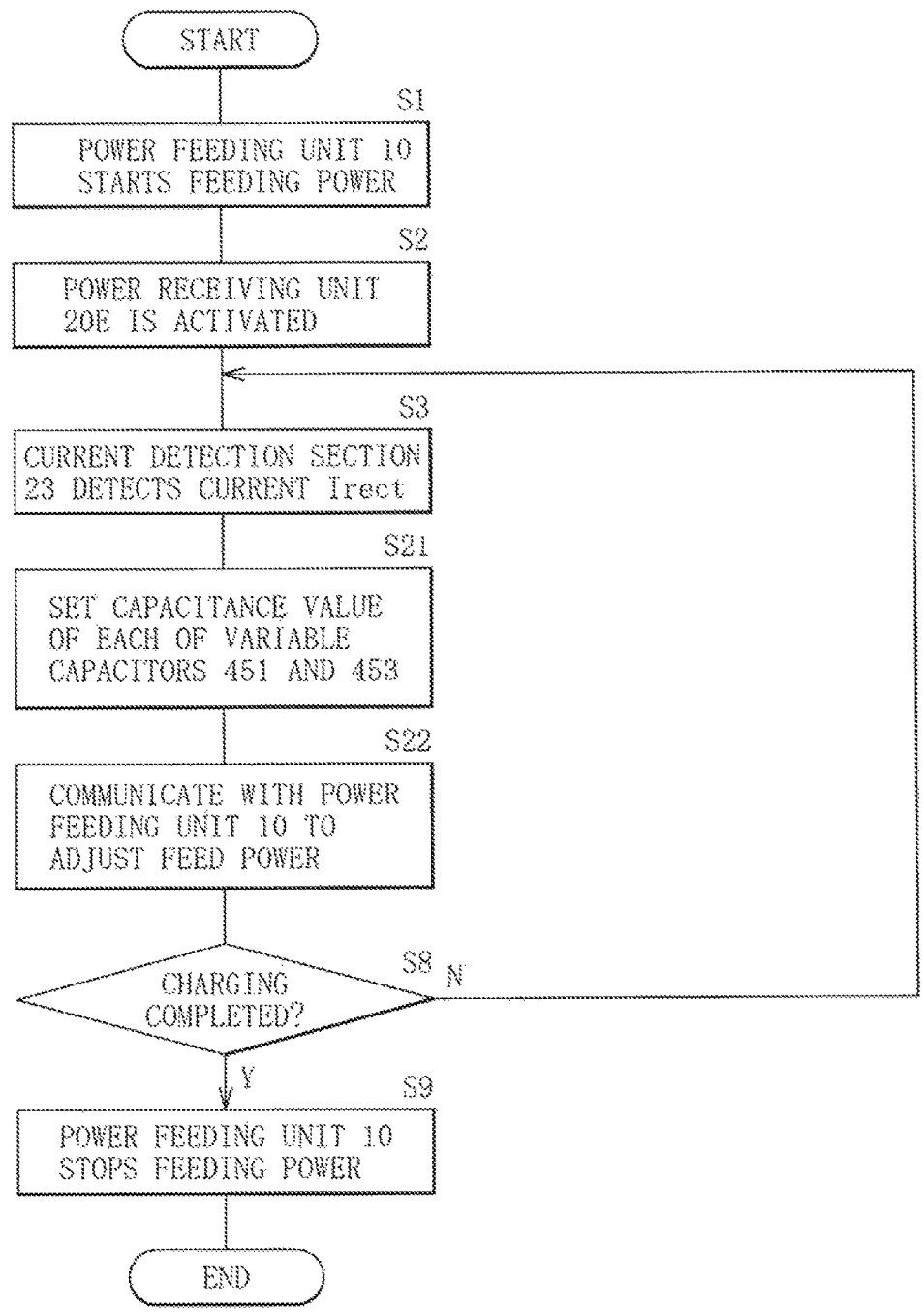
[ FIG. 16 ]

[FIG. 17]
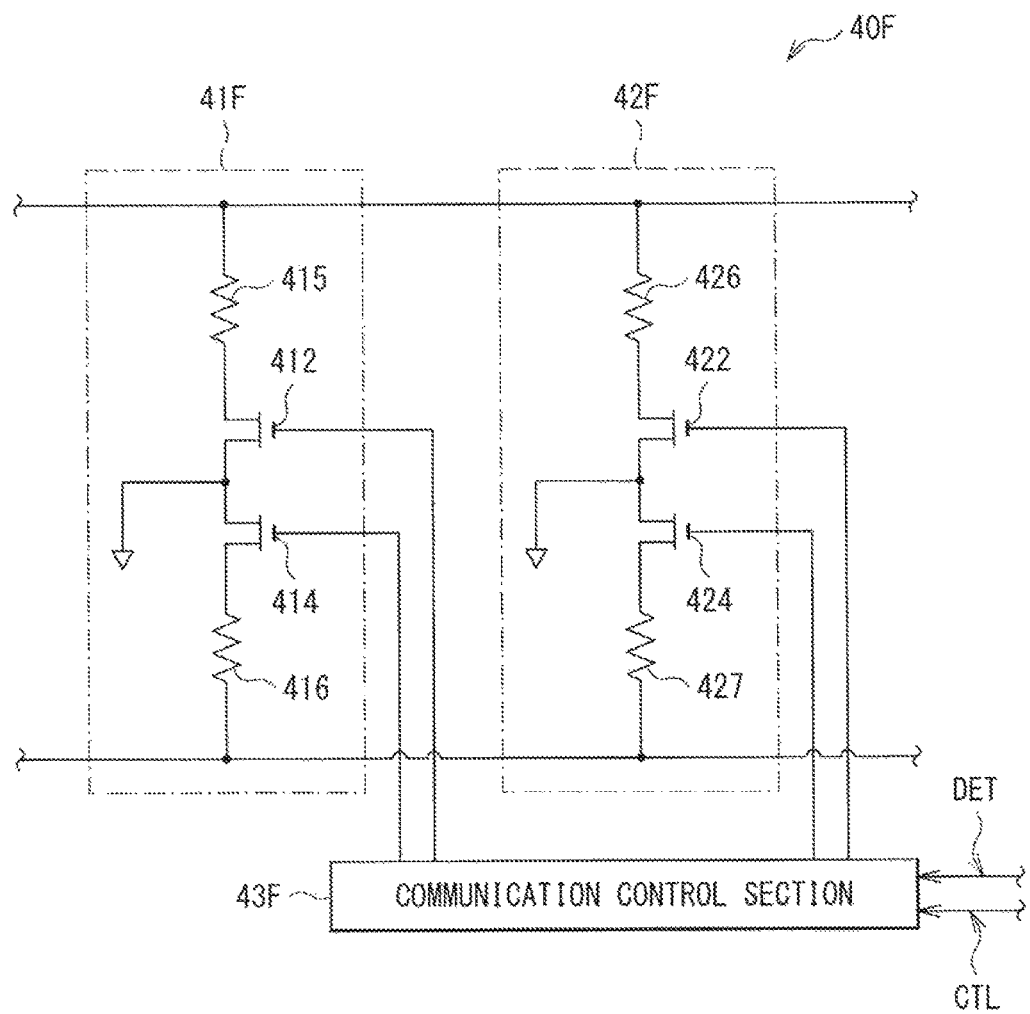

[ FIG. 18 ]
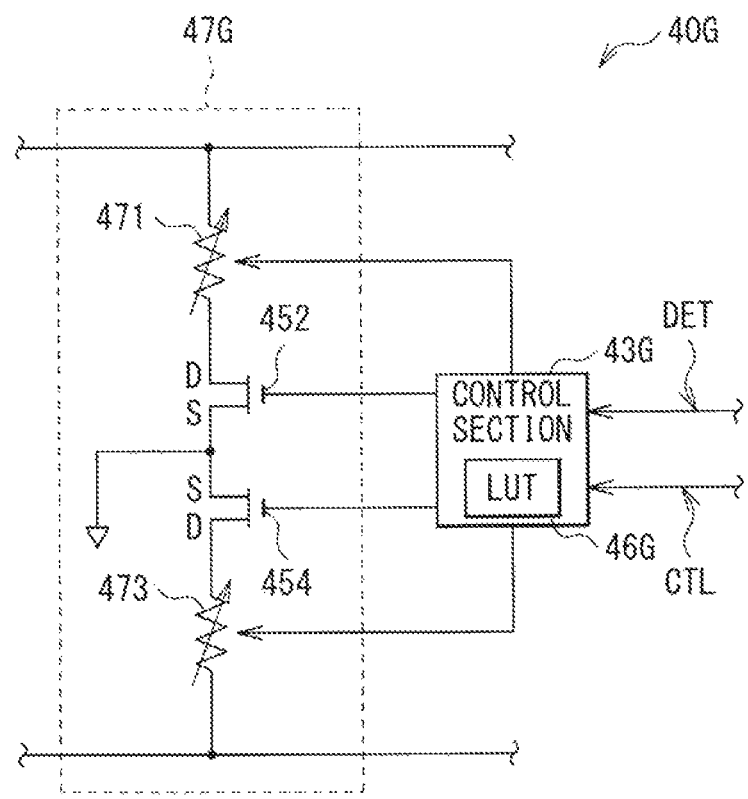

POWER RECEIVING UNIT, POWER FEEDING CONTROL METHOD, AND FEED SYSTEM

CROSS REFERENCE TO RELATED APPLICATIONS

This application is a U.S. National Phase of International Patent Application No. PCT/JP2015/053585 filed on Feb. 10, 2015, which claims priority benefit of Japanese Patent Application No. 2014-033228 filed in the Japan Patent Office on Feb. 24, 2014. Each of the above-referenced applications is hereby incorporated herein by reference in its entirety.

TECHNICAL FIELD

The disclosure relates to a power receiving unit that receives power wirelessly from a power feeding unit, a power feeding control method for use in such a power receiving unit, and a feed system using such a power receiving unit.

BACKGROUND ART

In recent years, a feed system that performs wireless power feeding (also called wireless power transfer, contact free, or non-contact power feeding) on consumer electronics devices (CE devices) such as, for example, mobile phones and portable music players has attracted attention. In such a feed system, for example, a mobile phone (power receiving unit) is allowed to be charged by placing the mobile phone on a power feeding tray (power feeding unit). Examples of the method of performing such wireless power feeding include an electromagnetic induction method and a magnetic field resonance method (also called magnetic resonance method) utilizing a resonance phenomenon. In these methods, power is transmitted utilizing magnetic coupling between a power feeding coil of a power feeding unit and a power receiving coil of a power receiving unit. Among them, the electromagnetic induction method has an advantage of being able to enhance the degree of coupling between the power feeding coil and the power receiving coil to enable feeding efficiency to be enhanced. In such a feed system, communications by means of so-called load modulation are often performed prior to the power feeding to adjust the feed power, for example.

Incidentally, there are some wireless communications which switch operation modes depending on circumstances. For example, Patent Literature 1 discloses an RF tag which selects, depending on the status of power storage of a power storage section, a passive mode in which communications are performed by means of load modulation or an active mode in which communications are performed through operation by a power supplied by the power source storage section.

CITATION LIST

Patent Literature

Patent Literature 1:
Japanese Unexamined Patent Application Publication No. 2009-65514

SUMMARY OF INVENTION

Incidentally, in general, an excessive voltage is desired not to occur in electronic apparatuses from the viewpoint of reliability, or the like, and an excessive voltage is expected not to occur also in feed systems.

Therefore, it is desirable to provide a power receiving unit, a power feeding control method, and a feed system that make it possible to reduce the risk of occurrence of an excessive voltage.

A power receiving unit according to an embodiment of the disclosure includes a power generation section and a communication section. The power generation section generates direct-current power, based on a power signal supplied wirelessly from a power feeding unit. The communication section sets a load of the power signal in accordance with an output current of the power generation section, and communicates with the power feeding unit by modulating the load.

A power feeding control method according to an embodiment of the disclosure includes generating direct-current power, based on a power signal supplied wirelessly from a power feeding unit, and communicating with the power feeding unit by setting a load of the power signal in accordance with a current to a circuit that is supplied with the direct-current power and modulating the load.

A feed system according to an embodiment of the disclosure is provided with a power feeding unit and a power receiving unit. The power receiving unit includes a power generation section and a communication section. The power generation section generates direct-current power, based on a power signal supplied wirelessly from the power feeding unit. The communication section sets a load of the power signal in accordance with an output current of the power generation section, and communicates with the power feeding unit by modulating the load.

In the power receiving unit, the power feeding control method, and the feed system according to an embodiment of the disclosure, the direct-current power is generated, based on the power signal supplied wirelessly from the power feeding unit, and communications are performed with the power feeding unit by modulating the load of the power signal. At this time, the load is set in accordance with the output current of the power generation section.

In accordance with the power receiving unit, the power feeding control method, and the feed system according to an embodiment of the disclosure, the load of the power signal is designed to be set in accordance with the output current of the power generation section, so that it becomes possible to reduce the risk of occurrence of an excessive voltage. Note that effects described herein are not necessarily limitative, and may include any of effects that will be described in the disclosure.

BRIEF DESCRIPTION OF DRAWINGS

FIG. 1 is a perspective view illustrating a configuration example of a feed system according to an embodiment of the disclosure.

FIG. 2 is a block diagram illustrating a configuration example of a power feeding unit illustrated in FIG. 1.

FIG. 3 is a block diagram illustrating a configuration example of an electronic apparatus illustrated in FIG. 1.

FIG. 4 is a circuit diagram illustrating a configuration example of a communication section illustrated in FIG. 3.

FIG. 5 is a flowchart illustrating an operation example of the feed system illustrated in FIG. 1.

FIG. 6 is a circuit diagram illustrating an equivalent circuit of a power receiving unit illustrated in FIG. 3.

FIG. 7 is a circuit diagram illustrating a configuration example of a communication section according to a comparative example.

FIG. 8 is a characteristic diagram illustrating an operation example of the feed system illustrated in FIG. 1.

FIG. 9 is a block diagram illustrating a configuration example of an electronic apparatus according to a modification.

FIG. 10 is a block diagram illustrating a configuration example of an electronic apparatus according to another modification.

FIG. 11 is a block diagram illustrating a configuration example of an electronic apparatus according to another modification.

FIG. 12 is a flowchart illustrating an operation example of a feed system according to another modification.

FIG. 13 is a characteristic diagram illustrating an operation example of a feed system according to another modification.

FIG. 14 is a circuit diagram illustrating a configuration example of a communication section according to another modification.

FIG. 15 is an explanatory diagram illustrating a configuration example of a lookup table illustrated in FIG. 14.

FIG. 16 is a flowchart illustrating an operation example of the feed system according to another modification.

FIG. 17 is a circuit diagram illustrating a configuration example of a communication section according to another modification.

FIG. 18 is a circuit diagram illustrating a configuration example of a communication section according to another modification.

DESCRIPTION OF EMBODIMENTS

Hereinafter, an embodiment of the disclosure will be described in detail with reference to drawings.

Configuration Example

FIG. 1 illustrates a configuration example of a feed system according to an embodiment. A feed system 1 is a feed system that feeds power by electromagnetic induction. Note that a power receiving unit and a power feeding control method according to an embodiment of the disclosure are embodied by the present embodiment, and thus will be described together.

The feed system 1 is provided with a power feeding unit 10 and an electronic apparatus 90. The power feeding unit 10 is a tray-type power feeding unit in this example, and allows for feeding of power to a power receiving unit 20 (to be described later) incorporated in the electronic apparatus 90 by placing the electronic apparatus 90 on a power feeding surface S1 of this power feeding unit 10 so as to charge a secondary battery 31 (to be described later).

This power feeding unit 10 has a power feeding coil 131 (to be described later) being disposed on the power feeding surface S1 thereof (a side to be in contact with the electronic apparatus 90), and the electronic apparatus 90 has a power receiving coil 211 (to be described later) being disposed on a power receiving surface thereof (a side to be in contact with the power feeding unit 10). The power feeding unit 10 feeds power to the electronic apparatus 90 by electromagnetic induction through these power feeding coil 131 and power receiving coil 211. At this time, the power receiving unit 20 of the electronic apparatus 90 communicates with the power feeding unit 10 by means of so-called load modulation to instruct the power feeding unit 10 on the feed power or the like. This enables a user to charge the secondary battery 31 without directly connecting an alternating current (AC) adapter or the like to the electronic apparatus 90, making it possible to enhance the convenience of the user.

Note that, while the electronic apparatus 90 is a digital camera in this example, the electronic apparatus 90 is not limited thereto, and various portable terminal devices such as, for example, a video camera, a smartphone, a mobile battery, a tablet, an electronic book reader, and an audio player are available. Further, while the power feeding unit 10 is designed to feed power to one electronic apparatus 90 in this example, this is not limitative; alternatively, the power feeding unit 10 may feed power to two or more electronic apparatuses 90 simultaneously or time-divisionally (sequentially).

FIG. 2 illustrates a configuration example of the power feeding unit 10. The power feeding unit 10 includes an AC/DC converter 11, a power transmission driver 12, the power feeding coil 131, a capacitor 132, a communication section 14, and a control section 15.

The AC/DC converter 11 converts an alternating-current power source signal supplied from an alternating-current power source 9 into a direct-current power source signal to supply the converted signal to the power transmission driver 12. Note that, while the alternating-current power source signal is supplied to the power feeding unit 10 in this example, this is not limitative; alternatively, for example, the direct-current power source signal may be supplied. In this case, for example, the AC/DC converter 11 is allowed to be omitted.

The power transmission driver 12 generates an alternating-current power signal Sp1 having a rectangular waveform, based on the direct-current power source signal supplied from the AC/DC converter 11, and outputs the generated power signal Sp1 as an inter-terminal signal between a first output terminal and a second output terminal. At this time, the power transmission driver 12 is designed to be able to change a feeding frequency fp of the power signal Sp1, based on an instruction from the control section 15.

The power feeding coil 131 is coupled to the power receiving coil 211 of the power receiving unit 20 through an electromagnetic field. One end of the power feeding coil 131 is connected to a first output terminal of the power transmission driver 12 through the capacitor 132, and the other end thereof is connected to a second output terminal of the power transmission driver 12. In this manner, the power feeding coil 131 and the capacitor 132 are connected in series to configure an LC resonance circuit. The power signal Sp1 is supplied by the power transmission driver 12 between both ends of each of the power feeding coil 131 and the capacitor 132 connected in series, thereby allowing the power feeding coil 131 to generate a magnetic field. The power feeding unit 10 is designed to feed power to the power receiving unit 20 of the electronic apparatus 90 through this magnetic field.

The communication section 14 communicates with the power receiving unit 20 (to be described later) of the electronic apparatus 90 to receive a feeding control signal CTL. This feeding control signal CTL includes information necessary for feeding operations, such as the increase request or decrease request of the feed power to the power feeding unit 10. The communication section 14 receives the feeding control signal CTL from the power receiving unit 20 by means of so-called load modulation. Specifically, the power feeding unit 10 first feeds power to the power receiving unit 20; during the power-feeding period, a communication section 40 (to be described later) of the power receiving unit 20 changes a load in accordance with a signal (feeding control signal CTL) to be transmitted. This change in the load appears as a change in the amplitude or phase of the power signal Sp1 in the power feeding unit 10. The communication section 14 is designed to be able to receive the feeding control signal CTL transmitted from the power receiving unit 20 by detecting the change in the amplitude or phase of the power signal Sp1.

Note that, while, in this example, the communication section 14 receives the feeding control signal CTL from the power receiving unit 20 of the electronic apparatus 90, this is not limitative; other signals may also be received, in addition to the feeding control signal CTL. Moreover, the communication section 14 may further have a function of transmitting a signal to the power receiving unit 20.

The control section 15 controls, based on the feeding control signal CTL, the power transmission driver 12 to control the feed power to the power receiving unit 20 (to be described later) of the electronic apparatus 90. At this time, the control section 15 is designed to control the feeding frequency fp of the power signal Sp1 generated by the power transmission driver 12 to change the power feeding efficiency from the power feeding unit 10 to the power receiving unit 20, thereby controlling the feed power.

FIG. 3 illustrates a configuration example of the electronic apparatus 90. The electronic apparatus 90 includes the power receiving unit 20, the secondary battery 31, and an electronic circuit 32. The power receiving unit 20 includes the power receiving coil 211, capacitors 212 and 213, a rectifier circuit 22, a current detection section 23, a voltage detection section 24, a control section 25, the communication section 40, and a regulator 27.

The power receiving coil 211 is coupled to the power feeding coil 131 of the power feeding unit 10 through an electromagnetic field. One end of the power receiving coil 211 is connected to a first input terminal of the rectifier circuit 22 through the capacitor 212, and the other end thereof is connected to a second input terminal of the rectifier circuit 22. Further, the capacitor 213 is inserted between the first input terminal and the second input terminal of the rectifier circuit 22. In this manner, the power receiving coil 211 and the capacitor 212 are connected in series to configure an LC resonance circuit. In addition, based on an electromagnetic field generated by the power feeding coil 131 of the power feeding unit 10, the power receiving coil 211 is designed to generate an induction voltage in accordance with the change in the magnetic flux thereof, according to the law of electromagnetic induction.

The circuit composed of the power receiving coil 211 and the capacitors 212 and 213 generates an alternating-current power signal Sp2 having a voltage in accordance with an induction voltage between both ends of the receiving coil 211, and supplies the generated power signal Sp2 to the rectifier circuit 22. That is, this power signal Sp2 is generated based on the power signal Sp1 in the power feeding unit 10.

The rectifier circuit 22 is a bridge-type full-wave rectifier circuit that rectifies the alternating-current power signal Sp2 to generate a direct-current signal having a voltage Vrect. The rectifier circuit 22 includes diodes 221 to 224 and a capacitor 225. An anode of the diode 221 is connected to the first input terminal of the rectifier circuit 22, and a cathode thereof is connected to a first output terminal of the rectifier circuit 22. An anode of the diode 222 is connected to a second output terminal of the rectifier circuit 22, and a cathode thereof is connected to the first input terminal of the rectifier circuit 22. An anode of the diode 223 is connected to the second input terminal of the rectifier circuit 22, and a cathode thereof is connected to the first output terminal of the rectifier circuit 22. An anode of the diode 224 is connected to the second output terminal of the rectifier circuit 22, and a cathode thereof is connected to the second input terminal of the rectifier circuit 22. One end of the capacitor 225 is connected to the first output terminal of the rectifier circuit 22, and the other end thereof is connected to the second output terminal of the rectifier circuit 22. The second output terminal of the rectifier circuit 22 is grounded. Thus, the rectifier circuit 22 is configured such that a rectified and smoothed direct-current signal is generated at the first output terminal thereof.

Note that, while the rectifier circuit 22 is configured using the diodes 221 to 224 and the capacitor 225 in this example, this is not limitative, and various rectifier circuits are employable.

The current detection section 23 detects a current Irect at the first output terminal of the rectifier circuit 22. Further, the current detection section 23 is designed to supply a detection result thereof DET to the communication section 40. The voltage detection section 24 detects the voltage Vrect at the first output terminal of the rectifier circuit 22. Further, the voltage detection section 24 is designed to supply a detection result thereof to the control section 25.

The control section 25 generates the feeding control signal CTL, based on the detection result of the voltage detection section 24. Specifically, the control section 25 is designed to request the power feeding unit 10 to increase or decrease the feed power via the feeding control signal CTL, based on the output voltage Vrect of the rectifier circuit 22, and to control this voltage Vrect so as to be within a predetermined voltage range, for example.

The communication section 40 communicates with the power feeding unit 10, and transmits the feeding control signal CTL. Specifically, the communication section 40 is designed to transmit the feeding control signal CTL to the power feeding unit 10 by changing a load in accordance with data (feeding control signal CTL) to be transmitted.

FIG. 4 illustrates a configuration example of the communication section 40. The communication section 40 includes modulation circuits 41 and 42, and a communication control section 43.

The modulation circuit 41 includes capacitors 411 and 413, and transistors 412 and 414. The capacitors 411 and 413 each have a capacitance value of 22 [nF], for example. In this example, each of the transistors 412 and 414 is an N-channel metal oxide semiconductor (MOS) type field effect transistor (FET). One end of the capacitor 411 is connected to the first input terminal of the rectifier circuit 22, and the other end thereof is connected to a drain of the transistor 412. A gate of the transistor 412 is supplied with a control signal from the communication control section 43, a drain thereof is connected to the other end of the capacitor 411, and a source thereof is grounded. One end of the capacitor 413 is connected to the second input terminal of the rectifier circuit 22, and the other end thereof is connected to a drain of the transistor 414. A gate of the transistor 414 is supplied with a control signal from the communication control section 43, a drain thereof is connected to the other end of the capacitor 413, and a source thereof is grounded.

The modulation circuit 42 having a configuration similar to that of the modulation circuit 41 includes capacitors 421 and 423, and transistors 422 and 424. The capacitance value of each of the capacitors 421 and 423 is lower than the capacitance value of each of the capacitors 411 and 413 of the modulation circuit 41 in this example, and is 4.7 [nF], for example. In this example, each of the transistors 422 and 423 is an N-channel MOS type FET. One end of the capacitor 421 is connected to the first input terminal of the rectifier circuit 22, and the other end thereof is connected to a drain of the transistor 422. A gate of the transistor 422 is supplied with a control signal from the communication control section 43, a drain thereof is connected to the other end of the capacitor 421, and a source thereof is grounded. One end of the capacitor 423 is connected to the second input terminal of the rectifier circuit 22, and the other end thereof is connected to a drain of the transistor 424. A gate of the transistor 424 is supplied with a control signal from the communication control section 43, a drain thereof is connected to the other end of the capacitor 423, and a source thereof is grounded.

The communication control section 43 controls the operations of the modulation circuits 41 and 42, based on the detection result DET and the feeding control signal CTL. Specifically, the communication control section 43 compares the current value of the output current Irect of the rectifier circuit 22 with a predetermined threshold value Ith, based on the detection result DET, and selects a modulation circuit to be used out of the modulation circuits 41 and 42, based on the comparison result. Then, when selecting the modulation circuit 41, the communication control section 43 supplies a control signal to each gate of the transistors 412, 414, 422, and 424 such that the transistors 412 and 414 are turned on or off in accordance with the feeding control signal CTL and that the transistors 422 and 424 are kept off. Further, when selecting the modulation circuit 42, the communication control section 43 is designed to supply a control signal to each gate of the transistors 412, 414, 422, and 424 such that the transistors 412 and 414 are kept off and that the transistors 422 and 424 are turned on or off in accordance with the feeding control signal CTL.

During a period of time when the power feeding unit 10 feeds power to the power receiving unit 20, in the communication section 40, the transistors 412, 414, 422, and 424 are turned on or off in this manner, thereby allowing a load as viewed from the power feeding unit 10 to be changed in accordance with the feeding control signal CTL. Then, the communication section 14 of the power feeding unit 10 detects this change in the load. Thus, the communication section 40 is designed to be able to transmit the feeding control signal CTL to the power feeding unit 10.

The regulator 27 generates direct-current power having a desired voltage Vreg, based on a direct-current signal supplied from the rectifier circuit 22.

The secondary battery 31 stores direct-current power supplied from the regulator 27, and uses a rechargeable battery such as a lithium-ion battery, for example. The electronic circuit 32 receives the supply of power from the secondary battery 31 to perform operations for achieving the functions of the electronic apparatus 90.

In the feed system 1, the power receiving unit 20 receives the supply of power from the power feeding unit 10, and transmits the feeding control signal CTL to the power feeding unit 10 by means of load modulation to adjust the feed power. Then, the power receiving unit 20 charges the secondary battery 31. At this time, in the power receiving unit 20, a circuit to be used is selected out of the modulation circuits 41 and 42 in accordance with the current value of the current Irect. Thus, the power receiving unit 20 is designed to be able to reduce the risk of occurrence of an excessive voltage, for example, even when the output current Irect is changed depending on the charging state of the secondary battery 31, as will be described later.

Here, the power receiving coil 211, the capacitors 212 and 213, the rectifier circuit 22, the voltage detection section 24, the control section 25, and the regulator 27 correspond to a specific example of "power generation section" in the disclosure. The current detection section 23 and the communication section 40 correspond to a specific example of "communication section" in the disclosure. The transistors 412 and 414 correspond to a specific example of "first switch" in the disclosure. The capacitors 411 and 413 correspond to a specific example of "first passive element" in the disclosure. The transistors 422 and 424 correspond to a specific example of "second switch" in the disclosure. The capacitors 421 and 423 correspond to a specific example of "second passive element" in the disclosure.

[Operation and Function]

Next, the operation and function of the feed system 1 of the present embodiment will be described.

[General Operation Outline]

First, the general operation outline of the feed system 1 will be described with reference to FIGS. 1 to 4. In the power feeding unit 10, the AC/DC converter 11 converts an alternating-current power source signal supplied from the alternating-current power source 9 into a direct-current power source signal, and supplies the converted signal to the power transmission driver 12. The power transmission driver 12 generates, based on the alternating-current power source signal supplied from the AC/DC converter 11, the alternating-current power signal Sp1 having a rectangular waveform and supplies the power signal Sp1 to the power feeding coil 131. The power feeding coil 131 generates an electromagnetic field, based on the power signal Sp1. The communication section 14 communicates with the communication section 40 of the power receiving unit 20 to receive the feeding control signal CTL. The control section 15 controls, based on the feeding control signal CTL, the power transmission driver 12 to control the feed power to the power receiving unit 20.

In the electronic apparatus 90, based on the electromagnetic field generated by the power feeding coil 131, the power receiving coil 211 generates an induction voltage in accordance with the change in the magnetic flux thereof. Then, the power receiving coil 211 and the capacitors 212 and 213 supply the power signal Sp2 corresponding to the power signal Sp1 to the rectifier circuit 22. The rectifier circuit 22 rectifies the power signal Sp2 to generate a direct-current signal having the voltage Vrect. The current detection section 23 detects the output current Irect of the rectifier circuit 22. The voltage detection section 24 detects the output voltage Vrect of the rectifier circuit 22. The control section 25 generates the feeding control signal CTL, based on the output voltage Vrect of the rectifier circuit 22. The communication section 40 communicates with the communication section 14 of the power feeding unit 10 to transmit the feeding control signal CTL. Specifically, the communication control section 43 of the communication section 40 selects, based on the current Irect, a modulation circuit to be used out of the modulation circuits 41 and 42, and the selected modulation circuit transmits the feeding control signal CTL by means of load modulation. The regulator 27 generates direct-current power having a desired voltage Vreg, based on the direct-current signal supplied from the rectifier circuit 22.

The secondary battery 31 stores direct-current power supplied from the regulator 27. The electronic circuit 32 receives the supply of power from the secondary battery 31 to perform operations for achieving the functions of the electronic apparatus 90.

(Detailed Operations)

FIG. 5 illustrates a flowchart of feeding operations of the feed system 1. For example, when a user places the electronic apparatus 90 on the power feeding surface S1 of the power feeding unit 10, the power feeding unit 10 feeds power to the power receiving unit 20 to allow periodic communications to be performed between the power feeding unit 10 and the power receiving unit 20, thereby adjusting the feed power. Hereinafter, the details thereof will be described.

For example, when a user places the electronic apparatus 90 on the power feeding surface S1 of the power feeding unit 10, the power feeding unit 10 first starts feeding power to the power receiving unit 20 of the electronic apparatus 90 (step S1). At this time, the power feeding unit 10 sets the feed power low to start feeding power.

Next, the power receiving unit 20 is activated based on the power supplied from the power feeding unit 10 (step S2).

Next, the current detection section 23 of the power receiving unit detects the output current Irect of the rectifier circuit 22 (step S3).

Next, the communication control section 43 of the communication section 40 determines whether or not the current Irect detected at step S3 is larger than the predetermined threshold value Ith (Irect>Ith) (step S4). This predetermined threshold value Ith may be set at 100 [mA], for example.

At step S4, when the current Irect is larger the predetermined threshold value Ith (Irect>Ith) ("Y" at step S4), the communication control section 43 selects the modulation circuit 41 which has a larger capacitance value (step S5).

Further, at step S4, when the current Irect is equal to or smaller than the predetermined threshold value Ith (Irect≤Ith) ("N" at step S4), the communication control section 43 selects the modulation circuit 42 which has a smaller capacitance value (step S6).

Next, the communication section 40 communicates with the power feeding unit 10 using the modulation circuit selected at step S5 or S6 to adjust the feed power (step S7). Specifically, the control section 25 of the power receiving unit 20 first generates the feeding control signal CTL indicating the increase request or decrease request of the feed power, based on the output voltage Vrect of the rectifier circuit 22. Then, the communication section 40 transmits the feeding control signal CTL to the power feeding unit 10. In the power feeding unit 10, the communication section 14 receives the feeding control signal CTL, and the control section 15 controls, based on the feeding control signal CTL, the feeding frequency fp of the power signal Sp1 generated by the power transmission driver 12 to control the feed power. In the feed system 1, the feed power is adjusted by repeating these operations until the voltage Vrect falls within a predetermined voltage range, for example.

Next, the control section 25 determines whether or not the charging of the secondary battery 31 has been completed (step S8). Specifically, the control section 25 determines whether or not the charging of the secondary battery 31 has been completed, based on a voltage or a current Iload in the secondary battery 31, for example.

At step S8, when it is determined that the charging of the secondary battery 31 has not yet been completed ("N" at step S8), the process returns to step S3. Then, the operations of the steps S3 to S8 are repeated until the charging is completed.

At step S8, when it is determined that the charging of the secondary battery 31 has been completed ("Y" at step S8), the power feeding unit 10 stops feeding power (step S9). Specifically, the control section 25 of the power receiving unit 20 generates the feeding control signal CTL indicating the stop request of the power feeding, and the communication section 40 transmits the feeding control signal CTL to the power feeding unit 10. Then, in the power feeding unit 10, the communication section 14 receives the feeding control signal CTL, and the control section 15 stops feeding power, based on the feeding control signal CTL.

After the foregoing steps, this flow is ended.

In this manner, in the power receiving unit 20, one of the modulation circuits 41 and 42 is selected in accordance with the output current Irect of the rectifier circuit 22. This makes it possible to reduce the risk of occurrence of an excessive voltage in the power receiving unit 20, as set forth below.

FIG. 6 illustrates an equivalent circuit of the electronic apparatus 90. Impedance Zmod indicates impedance of the communication section 40; one end thereof is connected to one end of the power receiving coil 211 through the capacitor 212, and the other end thereof is connected to the other end of the power receiving coil 211. Impedance Zload indicates impedance of the rectifier circuit 22 or a subsequent circuit as viewed from the input terminal of the rectifier circuit 22; one end thereof is connected to one end of the power receiving coil 211 through the capacitor 212, and the other end thereof is connected to the other end of the power receiving coil 211. In this manner, in the power receiving unit 20, the impedances Zmod and Zload are connected in parallel. That is, it follows that the power feeding unit 10 sees the parallel impedance of the impedances Zmod and Zload as a load.

The impedance Zload is affected by the rectifier circuit 22 or a subsequent circuit, so that the value thereof is changed. That is, for example, when the charging level of the secondary battery 31 is low, the regulator 27 charges the secondary battery 31 with a larger current Iload. In this case, the current Irect becomes larger, and thus the impedance Zload becomes smaller. On the other hand, for example, when the charging level of the secondary battery 31 is sufficiently high, the regulator 27 charges the secondary battery 31 with a smaller current Iload, or stops charging. In this case, the current Irect becomes smaller, and thus the impedance Zload becomes larger.

In this manner, the value of the impedance Zload is changed depending on the charging state of the secondary battery 31, for example. As described in steps S4 to S6 of FIG. 5, the communication control section 43 selects one of the modulation circuits 41 and 42 in accordance with the output current Irect of the rectifier circuit 22. In other words, the communication control section 43 selects one of the modulation circuits 41 and 42 in accordance with the impedance Zload. That is, when the current Irect is larger than the predetermined threshold value Ith, the communication control section 43 determines that the impedance Zload is small, and selects the modulation circuit 41 which has smaller impedance Zmod (larger capacitance value of the capacitor) (step S5). Further, at step S6, when the current Irect is equal to or smaller than the predetermined threshold value Ith, the communication control section 43 determines that the impedance Zload is large, and selects the modulation circuit 42 which has larger impedance Zmod (smaller capacitance value of the capacitor) (step S6).

In this manner, the feed system 1 is configured such that one of the modulation circuits 41 and 42 is selected in accordance with the impedance Zload, so that stable communication is performable. That is, there is a risk that stable communication is prevented from being performed, for example, in a case where a feed system is configured such that one modulation circuit is constantly used even when the impedance Zload is changed. Specifically, there is a risk that a suitable degree of modulation is prevented from being achieved, for example, when the impedance Zmod of the modulation circuit is approximately the maximum value of possible values of the impedance Zload. That is, since the power feeding unit 10 sees the parallel impedance of the impedances Zmod and Zload as a load, there is a risk that the load is prevented from being modulated sufficiently by the modulation circuit, for example, when the impedance Zload is small (the load is large). In contrast, the feed system 1 is configured such that one of the modulation circuits 41 and 42 is selected in accordance with the impedance Zload, and thus it is possible to maintain a suitable degree of modulation regardless of the value of the impedance Zload, and thereby to perform stable communication.

Further, the feed system 1 is configured such that one of the modulation circuits 41 and 42 is selected in accordance with the impedance Zload, so that it is possible to suppress the increase in a voltage in the power receiving unit 20, compared to a power receiving unit 20R according to the comparative example as set forth below.

Comparative Example

Next, the power receiving unit 20R according to the comparative example will be described. The power receiving unit 20R includes a communication section 40R including a single modulation circuit 44R. Other components are similar to those of the present embodiment (FIG. 3).

FIG. 7 illustrates a configuration example of the communication section 40R. The communication section 40R includes the modulation circuit 44R, and a communication control section 43R. That is, unlike the communication section 40 according to the present embodiment, the communication section 40R includes the single modulation circuit 44R. The modulation circuit 44R having a configuration similar to those of the modulation circuits 41 and 42 according to the present embodiment includes capacitors 441 and 443, and transistors 442 and 444. The capacitors 441 and 443 each have a capacitance value of 24 [nF], for example. The communication control section 43R controls the operations of the modulation circuit 44R such that that the transistors 442 and 444 of the modulation circuit 44R are turned on or off in accordance with the feeding control signal CTL. This configuration allows the impedance Zmod of the modulation circuit 44R to be approximately the minimum value of possible values of the impedance Zload.

In this configuration, since the impedance Zmod of the modulation circuit 44R is small, the load is sufficiently modulated by the modulation circuit 44R, even when the value of the impedance Zload is small (even when the load is large). However, when the impedance Zload is large (when the load is small), there is a risk, for example, that the output voltage Vrect of the rectifier circuit 22 may be increased due to a harmonic of the power signal Sp2, as set forth below.

FIG. 8 illustrates output voltages Vrect of the rectifier circuit 22 at various feeding frequencies fp when the impedance Zload is large. This FIG. 8 illustrates the voltage Vrect in the power receiving unit 20R during communication, and the voltages Vrect in the power receiving unit 20 during communication and during non-communication. Note that the voltage Vrect in the power receiving unit 20R during non-communication is substantially the same as the output voltage Vrect of the rectifier circuit 22 in the power receiving unit 20 during non-communication.

As illustrated in FIG. 8, in the power receiving unit 20R, the output voltage Vrect of the rectifier circuit 22 is undesirably increased at around 150 [kHz] during communication in this example. This is because the harmonic frequency of the power signal Sp2 approximates a multiple resonance frequency fres of the power receiving unit 20R. Here, the multiple resonance frequency fres is represented by the following expression:

[Numerical Expression 1]

$$f_{res} = \frac{1}{2\pi\sqrt{LC(1-k^2)}} \quad (1)$$

where L denotes an inductance value of the power receiving coil 211 (20 [μH] in this example), C denotes a series capacitance value of each of the capacitors 411 and 413 (12 [nF] in this example), and k denotes a coupling coefficient between the power feeding coil 131 and the power receiving coil 211 (0.7 in this example). The multiple resonance frequency fres in this example is about 455 [kHz]. Accordingly, when the frequency of the feeding signal Sp2 is near 150 [kHz], a tertiary harmonic frequency approximates the multiple resonance frequency fres, and thus the output voltage Vrect of the rectifier circuit 22 is undesirably increased, as illustrated in FIG. 8. In this manner, when an excessive voltage occurs in the power receiving unit 20, there is a risk that the circuit may be broken, or the reliability thereof may be deteriorated. In order to reduce such a risk, it is necessary to enhance the pressure resistance of the circuit, which may undesirably increase the size and cost thereof, for example.

In contrast, the power receiving unit 20 according to the present embodiment is configured such that two modulation circuits 41 and 42 are provided, and that the modulation circuit 42 is selected which has larger impedance Zmod (smaller capacitance value of the capacitor), when the impedance Zload is large. This makes it possible to change the multiple resonance frequency fres into a higher frequency when the impedance Zload is large. As a result, it is possible for the power receiving unit 20 to reduce the output voltage Vrect of the rectifier circuit 22 during communication compared to the power receiving unit 20R, as illustrated in FIG. 8. In this manner, it is possible for the power receiving unit 20 to reduce the risk of occurrence of an excessive voltage, which therefore makes it possible to reduce the risk that the circuit may be broken, or the reliability thereof may be deteriorated.

Further, the power receiving unit 20 thus reduces the output voltage Vrect of the rectifier circuit 22, so that it is possible to increase the feed power. That is, when increasing the feed power, a method of increasing a voltage and a method of increasing a current are considered; however, the method of increasing a voltage is more desirable, since it is possible to miniaturize the power feeding coil 131 or the power receiving coil 211, for example. In this case, the power receiving unit 20 suppresses the increase in a voltage due to a harmonic, and thus increases the feed power by the decrement of the voltage. As a result, it is possible for the feed system 1 to charge the secondary battery 31 in a short period of time, for example.

[Effects]

As described above, in the present embodiment, two modulation circuits are provided, and a modulation circuit having a smaller capacitance value of the capacitor is selected when the impedance Zload is large. Hence, it is possible to reduce the risk of occurrence of an excessive voltage in the power receiving unit, and to reduce the risk that the circuit may be broken, or the reliability thereof may be deteriorated. In addition, since a voltage in each node is thus reduced, it is possible to increase the feed power, and to charge a secondary battery in a short period of time.

As described above, in the present embodiment, one of the modulation circuits 41 and 42 is selected in accordance with the change in the impedance Zload. Hence, it is possible to maintain a suitable degree of modulation, and thereby to perform stable communication.

[Modification 1]

While, in the above-described embodiment, the communication section 40 selects, based on the current Irect, one of the modulation circuits 41 and 42, this is not limitative. Alternatively, one of the modulation circuits 41 and 42 may be selected based on the current Irect and the voltage Vrect, for example, as in an electronic apparatus 90A illustrated in FIG. 9. The electronic apparatus 90A is provided with a power receiving unit 20A including a communication section 40A. Similarly to the communication section 40 according to the above-described embodiment, the communication section 40A communicates with the power feeding unit 10 to transmit the feeding control signal CTL by means of load modulation. At this time, the communication section 40A determines, based on the current Irect and the voltage Vrect, a load power value, and compares the load power value with a predetermined threshold value to select one of the modulation circuits 41 and 42. Also in this manner, it is possible to achieve effects similar to those of the above-described power receiving unit 20.

[Modification 2]

While, in the above-described embodiment, the communication section 40 selects, based on the output current Irect of the rectifier circuit 22, one of the modulation circuits 41 and 42, this is not limitative. Alternatively, one of the modulation circuits 41 and 42 may be selected based on an output current Iload of the regulator 27, for example, as in an electronic apparatus 90B illustrated in FIG. 10. The electronic apparatus 90B is provided with a power receiving unit 20B including a current detection section 23B. This current detection section 23B detects the output current Iload of the regulator 27, and supplies the detection result to the communication section 40. Further, one of the modulation circuits 41 and 42 may be selected based on an input current of the rectifier circuit 22, for example, as in an electronic apparatus 90C illustrated in FIG. 11. The electronic apparatus 90C is provided with a power receiving unit 20C including a current detection section 23C. This current detection section 23C detects the input current of the rectifier circuit 22, and determines the peak value and the root mean square (RMS) value of the input current to supply them to the communication section 40. That is, since the input current of the rectifier circuit 22 is an alternating current, the current detection section 23C determines the peak value and the RMS value of this input current. Also in this manner, it is possible to achieve effects similar to those of the above-described power receiving unit 20.

[Modification 3]

While, in the above-described embodiment, the communication control section 43 of the communication section 40 selects one of the modulation circuits 41 and 42, this is not limitative; alternatively, the communication control section 43 may be designed to select one or both of the modulation circuits 41 and 42, for example. Hereinafter, a feed system 1D according to the present modification will be specifically described.

Similarly to the feed system 1 (FIG. 1) according to the above-described embodiment, the feed system 1D is provided with the power feeding unit 10 and an electronic apparatus 90D including a power receiving unit 20D. Similarly to the power receiving unit 20 (FIGS. 3 and 4) according to the above-described embodiment, the power receiving unit 20D includes a communication section 40D including a communication control section 43D. The communication control section 43D compares the current value of the current Irect with two predetermined threshold values Ith1 and Ith2, based on the detection result DET. Here, the threshold value Ith1 is larger than the threshold value Ith2 (Ith1>Ith2). Then, the communication control section 43D is designed to select one or both of the modulation circuits 41 and 42, based on the comparison result.

FIG. 12 illustrates a flowchart of feeding operations of the feed system 1D. Similarly to the operations of the feed system 1 according to the above-described embodiment, in this feed system 1D, the power feeding unit 10 first starts feeding power (step S1), the power receiving unit 20D is activated (step S2), and the current detection section 23 detects the current Irect (step S3).

Next, the communication control section 43D determines whether or not the current Irect detected at step S3 is larger than the predetermined threshold value Ith1 (Irect>Ith1) (step S11).

At step S11, when the current Irect is larger than the predetermined threshold value Ith1 (Irect>Ith1) ("Y" at step S11), the communication control section 43D selects both of the modulation circuits 41 and 42 (step S12).

Further, at step S11, when the current Irect is equal to or smaller than the predetermined threshold value Ith1 (Irect≤Ith1) ("N" at step S11), the communication control section 43D determines whether or not the current Irect detected at step S3 is larger than the predetermined threshold value Ith2 (Irect>Ith2) (step S13).

At step S13, when the current Irect is larger than the predetermined threshold value Ith2 (Irect>Ith2) ("Y" at step S13), the communication control section 43D selects the modulation circuit 41 which has a larger capacitance value (step S14).

Further, at step S13, when the current Irect is equal to or smaller than the predetermined threshold value Ith2 (Irect≤Ith2) ("N" at step S13), the communication control section 43D selects the modulation circuit 42 which has a smaller capacitance value (step S15).

Next, the communication section 40 communicates with the power feeding unit 10 using the modulation circuit(s) selected at step S12, S14, or S15 to adjust the feed power (step S7). Then, in the feed system 1D, these operations are repeated until the charging is completed, similarly to the feed system 1 according to the above-described embodiment. Also in this manner, it is possible to achieve effects similar to those of the above-described power receiving unit 20.

[Modification 4]

While, in the above-described embodiment, the power feeding unit 10 adjusts the feed power by controlling the feeding frequency fp of the power signal Sp1, this is not limitative; alternatively, for example, the feed power may be adjusted by controlling duty ratio DR of the power signal Sp1. Also in this case, it is possible for the power receiving unit 20 to reduce a voltage in each node in the unit, as set forth below.

FIG. 13 illustrates output voltages Vrect of the rectifier circuit 22 at various duty ratios DR when the impedance Zload is large. This FIG. 13 illustrates the voltage Vrect in the power receiving unit 20R during communication, and the voltages Vrect in the power receiving unit 20 during communication and during non-communication.

As illustrated in FIG. 13, in the power receiving unit 20R, the output voltage Vrect of the rectifier circuit 22 is undesirably increased at around 20 [%] and at around 50 [%] during communication in this example. That is, since the change in the duty ratio DR allows a harmonic to be changed, the output voltage Vrect of the rectifier circuit 22 is also changed. In this example, when the duty ratio DR is near 20 [%], the voltage Vrect is undesirably increased.

In contrast, the power receiving unit 20 according to the present embodiment is configured such that the modulation circuit 42 is selected which has larger impedance Zmod (smaller capacitance value of the capacitor) when the impedance Zload is large, and therefore reduces the output voltage Vrect of the rectifier circuit 22 during communication compared to the power receiving unit 20R, as illustrated in FIG. 13. In this manner, it is possible for the power receiving unit 20 to reduce a voltage in each node in the unit, which therefore makes it possible to reduce the risk that the circuit may be broken, or the reliability thereof may be deteriorated.

[Modification 5]

In the above-described embodiment, the two modulation circuits 41 and 42 are provided, and one of them is selected to thereby change the capacitance value; however, this is not limitative. Alternatively, the capacitance value may be changed using a variable capacitor, for example. Hereinafter, a feed system 1E according to the present modification will be described in detail.

FIG. 14 illustrates a configuration example of a communication section 40E in a power receiving unit 20E according to the present modification. The communication section 40E includes a modulation circuit 45E and a communication control section 43E.

The modulation circuit 45E includes variable capacitors 451 and 453, and transistors 452 and 454. The variable capacitors 451 and 453 each have a capacitance value between both ends thereof, which is changed based on a voltage input to a control terminal. The control terminal of the variable capacitor 451 is supplied with a capacitance value control voltage Vcap1 from the communication control section 43E; one end thereof is connected to the first input terminal of the rectifier circuit 22, and the other end thereof is connected to a drain of the transistor 452. A gate of the transistor 452 is supplied with a control signal from the communication control section 43E, a drain thereof is connected to the other end of the variable capacitor 451, and a source thereof is grounded. The control terminal of the variable capacitor 453 is supplied with a capacitance value control voltage Vcap2 from the communication control section 43E; one end thereof is connected to the second input terminal of the rectifier circuit 22, and the other end thereof is connected to a drain of the transistor 454. A gate of the transistor 454 is supplied with a control signal from the communication control section 43E, a drain thereof is connected to the other end of the variable capacitor 453, and a source thereof is grounded.

The communication control section 43E generates, based on the detection result DET and the feeding control signal CTL, the capacitance value control voltages Vcap1 and Vcap2 to control the operations of the modulation circuit 45E. The communication control section 43E includes a lookup table (LUT) 46E. This lookup table 46E represents the correlation between the current Irect and the capacitance value control voltages Vcap1 and Vcap2.

FIG. 15 illustrates a configuration example of the lookup table 46E. For convenience of description, this FIG. 15 illustrates a capacitance value of each of the variable capacitors 451 and 453 instead of the capacitance value control voltages Vcap1 and Vcap2. In the lookup table 46E, the current Irect and the capacitance value of each of the variable capacitors 451 and 453 are associated with each other such that, as the current Irect becomes larger, the capacitance value thereof becomes larger.

The communication control section 43E sets the capacitance value of each of the variable capacitors 451 and 453, based on the detection result DET and this lookup table 46E. Thus, the communication control section 43E allows the capacitance value of each of the variable capacitors 451 and 453 to be larger (the impedance Zmod to be smaller) as the current Irect becomes larger (the impedance Zload becomes smaller). Further, the communication control section 43E is designed to turn on or off the transistors 452 and 454 in accordance with the feeding control signal CTL.

Note that, while the communication control section 43E is designed to allow the capacitance value of each of the variable capacitors 451 and 453 to be changed stepwise in accordance with the current Irect using the lookup table 46E in this example, this is not limitative. Alternatively, the capacitance value of each of the variable capacitors 451 and 453 may also be changed continuously in accordance with the current Irect using a function, for example.

FIG. 16 illustrates a flowchart of feeding operations of the feed system 1E. Similarly to the operations of the feed system 1 according to the above-described embodiment, in this feed system 1E, the power feeding unit 10 first starts feeding power (step S1), the power receiving unit 20E is activated (step S2), and the current detection section 23 detects the current Irect (step S3).

The communication control section 43E sets the capacitance value of each of the variable capacitors 451 and 453, based on the current Irect detected at step S3 (step S21). Specifically, the communication control section 43E generates, based on the current Irect, the capacitance value control voltages Vcap1 and Vcap2 utilizing the lookup table 46E, and supplies the capacitance value control voltage Vcap1 to the variable capacitor 451 and the capacitance value control voltage Vcap2 to the variable capacitor 453. Thus, a capacitance value between both ends of each of the variable capacitors 451 and 453 is set.

Then, the communication section 40E communicates with the power feeding unit 10 to adjust the feed power (step S22). Then, in the feed system 1E, these operations are repeated until the charging is completed, similarly to the feed system 1 according to the above-described embodiment. Also in this manner, it is possible to achieve effects similar to those of the above-described power receiving unit 20.

Moreover, since this power receiving unit 20E reduces the number of components compared to the power receiving unit 20, it is possible to reduce the number of terminals. That is, the capacitors 411, 413, 421 and 423 of the power receiving unit 20 and the variable capacitors 451 and 453 of the power receiving unit 20E each have a capacity of about several [nF], and thus may involve difficulty in integration, so that the capacitors are configured as external components, for example. Accordingly, it is necessary for the power receiving unit 20 to have terminals to be connected to these four capacitors 411, 413, 421, and 423. In contrast, it is enough for the power receiving unit 20E to have only two variable capacitors 451 and 453, making it possible to reduce the number of terminals. This makes it possible, for example, to miniaturize the power receiving unit 20E, and to simplify the layout of a substrate on which the power receiving unit 20E is mounted, making it possible to reduce costs.

[Modification 6]

While, in the above-described embodiment, the capacitors 411, 413, 421, and 423 are used to modulate a load, this is not limitative; alternatively, resistors 415, 416, 426, and 427 may also be used to modulate a load, as in a communication section 40F illustrated in FIG. 17, for example. The communication section 40F includes modulation circuits 41F and 42F, and a communication control section 43F. The modulation circuit 41F includes resistors 415 and 416. The modulation circuit 42F includes resistors 426 and 427.

Likewise, while in the above-described modification 5, the variable capacitors 451 and 453 are used to modulate a load, this is not limitative; alternatively, variable resistors 471 and 473 may also be used to modulate a load, as in a communication section 40G illustrated in FIG. 18, for example. The communication section 40G includes a modulation circuit 47G, and a communication control section 43G. The modulation circuit 47G includes the variable resistors 471 and 473. In each of the variable resistors 471 and 473, a resistance value between both ends thereof is changed based on a voltage input to a control terminal. The communication control section 43G controls the operations of the modulation circuit 47G, based on the detection result DET and the feeding control signal CTL. The communication control section 43G includes a lookup table (LUT) 46G.

Hereinabove, the present technology has been described with reference to embodiments and modifications. However, the present technology is not limited to these embodiments or the like, and various modifications may be made.

For example, in the above-described embodiments or the like, two modulation circuits 41 and 42 are provided, and the communication control section 43 of the communication section 40 selects one of the two modulation circuits 41 and 42; however, this is not limitative. Alternatively, for example, three or more modulation circuits may be provided, and the communication control section 43 may also be designed to select one of the three or more modulation circuits.

Moreover, for example, in the above-described embodiments or the like, the waveform of the power signal Sp1 is rectangular; however, this is not limitative, and any waveform may be employed as long as the power signal Sp1 has a harmonic component.

Note that the effects described in the present specification are merely examples without limitation, and other effects may be obtainable.

Note that the present technology may be configured as follows.

(1) A power receiving unit including:
a power generation section configured to generate direct-current power, based on a power signal supplied wirelessly from a power feeding unit; and
a communication section configured to set a load of the power signal in accordance with an output current of the power generation section, and to communicate with the power feeding unit by modulating the load.

(2) The power receiving unit according to (1), wherein the communication section sets the load to cause, when the output current of the power generation section is large, impedance of the load to be smaller, and to cause, when the output current of the power generation section is small, the impedance of the load to be larger.

(3) The power receiving unit according to (1) or (2), wherein the communication section includes
a first switch,
a first passive element connected in series to the first switch,
a second switch, and
a second passive element connected in series to the second switch, and
wherein the communication section sets the load by determining a switch to be turned on or off out of the first switch and the second switch in accordance with the output current of the power generation section.

(4) The power receiving unit according to (3), wherein an element value of the first passive element is different from an element value of the second passive element.

(5) The power receiving unit according to (3) or (4), wherein each of the first passive element and the second passive element is a capacitor.

(6) The power receiving unit according to (3) or (4), wherein each of the first passive element and the second passive element is a resistor.

(7) The power receiving unit according to (1) or (2), wherein the communication section includes
a switch, and
a variable passive element connected in series to the switch, and configured to cause an element value to be varied in accordance with the output current of the power generation section.

(8) The power receiving unit according to (7), wherein the variable passive element is a variable capacitor.

(9) The power receiving unit according to (7), wherein the variable passive element is a variable resistor.

(10) The power receiving unit according to any one of (1) to (9), wherein
the power generation section includes a rectifier circuit configured to rectify the power signal, and
the communication section sets the load of the power signal, based on an output current of the rectifier circuit.

(11) The power receiving unit according to (10), wherein the communication section sets the load, also based on an output voltage of the rectifier circuit.

(12) The power receiving unit according to any one of (1) to (9), wherein
the power generation section includes a regulator circuit configured to generate the direct-current power, and
the communication section sets the load, based on an output current of the regulator circuit.

(13) A power receiving control method including:
generating direct-current power, based on a power signal supplied wirelessly from a power feeding unit; and
communicating with the power feeding unit by setting a load of the power signal in accordance with a current to a circuit that is supplied with the direct-current power and modulating the load.

(14) A feed system provided with a power feeding unit and a power receiving unit, the power receiving unit including:
a power generation section configured to generate direct-current power, based on a power signal supplied wirelessly from the power feeding unit; and
a communication section configured to set a load of the power signal in accordance with an output current of the power generation section, and to communicate with the power feeding unit by modulating the load.

This application claims the benefit of Japanese Priority Patent Application JP 2014-033228 filed Feb. 24, 2014, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A power receiving unit, comprising:
a power generation section configured to:
   receive a power signal wirelessly from a power feeding unit; and
   generate a direct-current signal based on the received power signal; and
a communication section configured to:
   detect an output current of the power generation section based on the generated direct-current signal;
   compare the output current of the power generation section with a threshold current value;
   set a load of the power signal based on a result of the comparison; and
   communicate with the power feeding unit based on modulation of the load.

2. The power receiving unit according to claim 1, wherein the communication section is further configured to:
set the load to cause an impedance of the load to be equal to a first impedance value, in a case where the output current of the power generation section is greater than the threshold current value; and
set the load to cause the impedance of the load to be equal to a second impedance value, in a case where the output current of the power generation section is less than the threshold current value, wherein the first impedance value is smaller than the second impedance value.

3. The power receiving unit according to claim 1, wherein the communication section includes:
a first switch;
a first passive element connected in series to the first switch;
a second switch; and
a second passive element connected in series to the second switch, and
wherein the communication section is further configured to:
   determine one of the first switch or the second switch to be one of turned on or turned off, based on the output current of the power generation section; and
   set the load based on the determination.

4. The power receiving unit according to claim 3, wherein an element value of the first passive element is different from an element value of the second passive element.

5. The power receiving unit according to claim 3, wherein each of the first passive element and the second passive element is one of a capacitor or a resistor.

6. The power receiving unit according to claim 1, wherein the communication section includes:
a switch; and
a variable passive element connected in series to the switch, and
the communication section is further configured to vary an element value of the variable passive element based on the output current of the power generation section.

7. The power receiving unit according to claim 6, wherein the variable passive element is a variable capacitor.

8. The power receiving unit according to claim 6, wherein the variable passive element is a variable resistor.

9. The power receiving unit according to claim 1, wherein the power generation section includes a rectifier circuit configured to:
rectify the power signal; and
generate the direct-current signal based on the rectified power signal, and
the communication section is further configured to set the load of the power signal based on the generated direct-current signal.

10. The power receiving unit according to claim 9, wherein the communication section is further configured to set the load based on an output voltage of the rectifier circuit.

11. The power receiving unit according to claim 1, wherein
the power generation section includes a regulator circuit configured to generate a direct-current power based on the direct-current signal, and
the communication section is further configured to set the load based on an output current of the regulator circuit.

12. A power feeding control method, comprising:
receiving a power signal wirelessly from a power feeding unit;
generating a direct-current signal based on the received power signal;
detecting an output current based on the generated direct-current signal;
comparing the output current with a threshold current value;
setting a load of the power signal based on a result of the comparison; and
communicating with the power feeding unit based on modulating the load.

13. A feed system, comprising:
a power feeding unit; and
a power receiving unit, wherein the power receiving unit comprising:
a power generation section configured to:
   receive a power signal wirelessly from the power feeding unit; and
   generate a direct-current signal based on the received power signal; and
a communication section configured to:
   detect an output current of the power generation section based on the generated direct-current signal;
   compare the output current of the power generation section with a threshold current value;
   set a load of the power signal based on a result of the comparison; and
   communicate with the power feeding unit based on modulation of the load.

14. The power receiving unit according to claim 1, wherein the communication section is further configured to:
select a modulation circuit from a plurality of modulation circuits based on the result of the comparison; and
communicate with the power feeding unit based on the selected modulation circuit.

* * * * *